United States Patent [19]
Songhurst

[11] Patent Number: 5,390,883
[45] Date of Patent: Feb. 21, 1995

[54] RELEASABLE MOUNTING BINDER FOR WIRES AND CABLES

[76] Inventor: Ronald W. Songhurst, 3439 Bethune Avenue, Victoria, B.C., Canada, V8X 1W1

[21] Appl. No.: 225,629
[22] Filed: Apr. 11, 1994
[51] Int. Cl.⁶ .............................................. F16L 3/08
[52] U.S. Cl. .................................. 248/74.3; 248/68.1
[58] Field of Search .................... 248/74.3, 74.5, 74.1, 248/74.2, 68.1; 24/16 R, 16 PB; 174/40 R

[56] References Cited

U.S. PATENT DOCUMENTS

| | | | |
|---|---|---|---|
| 2,438,362 | 3/1948 | Dunkelberger | 248/74.3 X |
| 2,961,211 | 11/1960 | Emery | 174/40 R X |
| 3,454,249 | 7/1969 | Geisinger | 248/74.3 X |
| 3,632,071 | 1/1972 | Cameron | 248/74.3 |
| 3,913,876 | 10/1975 | McSherry | 248/74.3 |
| 3,971,105 | 7/1976 | Caveney | 248/74.3 X |
| 4,379,537 | 4/1983 | Perrault | 248/74.3 |
| 4,706,914 | 11/1987 | Ground | 248/74.3 |
| 4,854,015 | 8/1989 | Shaull | 24/16 R |
| 4,864,698 | 9/1989 | Brame | |
| 4,893,381 | 1/1990 | Frankel | 24/16 R |
| 4,899,963 | 2/1990 | Murphy | 24/16 R X |

FOREIGN PATENT DOCUMENTS

| | | |
|---|---|---|
| 685628 | 5/1964 | Canada . |
| 729343 | 5/1966 | Canada . |
| 1106578 | 8/1981 | Canada . |
| 1281531 | 3/1991 | Canada . |
| 1294114 | 1/1992 | Canada . |
| 2101731 | 2/1994 | Canada . |
| 1577220 | 6/1969 | France ............... 248/74.3 |

Primary Examiner—J. Franklin Foss
Attorney, Agent, or Firm—Burke-Robertson

[57] ABSTRACT

A releasable mounting binder for wires and cables, the binder comprising a buckle, a pair of spaced slots in the buckle, means to receive securing means for securing the buckle in position on a surface of a body, and a flexible strap having ends to be fitted through the slots, each opposite surface of each end of the strap having co-operating hook or pile securing means so that the ends are releasably securable to each other in overlapping, abutting relationship for releasably looping about wires and cables to secure them on the buckle.

8 Claims, 1 Drawing Sheet

RELEASABLE MOUNTING BINDER FOR WIRES AND CABLES

BACKGROUND OF THE INVENTION

The present invention relates to a releasable mounting binder for wires and cables.

The need for an economical yet effective and easy to use device for securing bundles or groups of wires or cables is something which has existed for many years. With computers, in automobiles, aircraft and marine craft, and in other wiring applications, there is often a need to group wires along paths for neatness and facility of handling. This has conventionally been done using strings, straps and tape. For example, Canadian Patent No. 729,343 of Caveney et al issued Mar. 8, 1966 teaches a non-releasable binder strap, incorporating a connected sleeve, for wires or cables.

The use of hook and pile fastening means (e.g. "VELCRO" (trade-mark) systems) in association with straps used for different purposes has been previously disclosed, for example in Canadian Patent No. 685,628 of Streule issued May 5, 1964 (shoe closures), and Canadian Patents Nos. 1,281,531 of Mitchell et al issued Mar. 19, 1991; 1,106,578 of Hasslinger issued Aug. 11, 1981 and 1,294,114 of Ground issued Jan. 14, 1992 and U.S. Pat. No. 4,864,698 of Brame issued Sept. 12, 1989. Canadian Patent No. 1,294,114 also teaches, in one embodiment thereof, the attaching of a rigid block to a surface of the strap, to which block an adhesive securing means may be placed, for securing the tape looped strap, when holding a bundle of wires, in a particular position on a surface.

Canadian Patent No. 2,101,731 of White et al issued Mar. 4, 1994 describes another construction of wire retention clip in which a flexible strap has one end integrally secured to a planar base, with the other end releasably securable, when looped about a bundle of wires, to another portion of the base.

It is an object of the present invention to provide an alternative construction of releasable mounting binder for wires and cables and which for many uses may prove easier to use and more versatile than many of these prior known constructions.

SUMMARY OF THE INVENTION

In accordance with the present invention there is provided a releasable mounting binder for wires and cables. The binder comprises a buckle. The buckle is provided with a pair of spaced slots and means to receive securing means for securing the buckle in position on a surface of a body. A flexible strap is also provided having ends to be fitted through the slots. Each opposite surface of at least each end of the strap has cooperating hook or pile securing means so that the ends are releasably securable to each other when in overlapping abutting relationship, for releasably looping about wires and cables to secure them on the buckle.

In a preferred embodiment of the present invention the strap is provided with hook securing means, and the other surface of the strap is provided with pile securing means, along the length of the strap.

The releasable mounting binder according to the present invention, by combining what is essentially a buckle with a floating looped strap therein, readily enables the strap to be wrapped about bundles of wire, cable, rope or the like from a variety of directions the buckle secured in any convenient location thereafter before or after the wires or cables are thus wrapped. In the preferred embodiment, with hook and pile fastener means along the length of the strap, on either surface, the strap is readily adjustable to snuggly secure within the strap a variety of sizes of wires and bundles thereof.

BRIEF DESCRIPTION OF THE DRAWINGS

These and other objects and advantages of the invention will become apparent upon reading the following detailed description and upon referring to the drawings in which.

Figure 1:
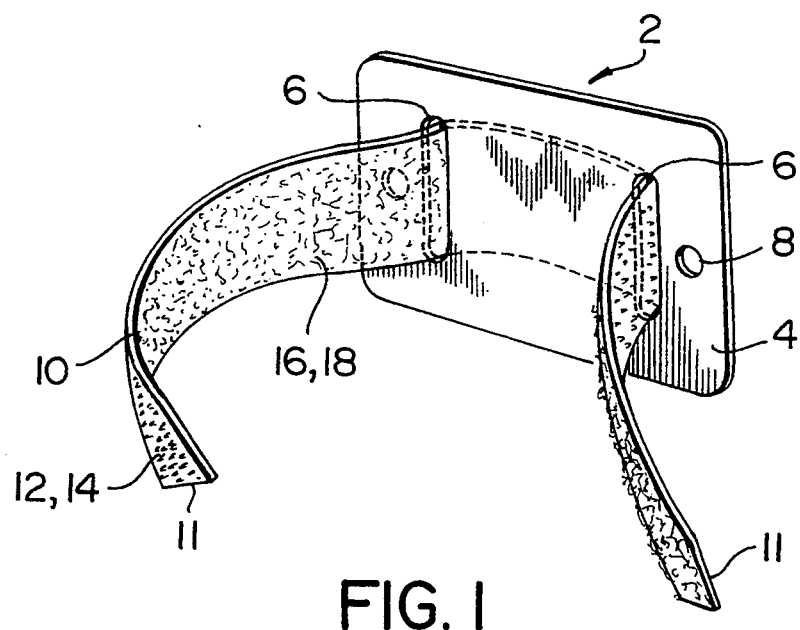
FIG. 1 is a perspective of a releasable mounting binder for wires and cables in accordance with the present invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the drawings, similar features have been given similar reference numerals.

Turning to FIG. 1 there is illustrated a releasable mounting binder 2 in accordance with the present invention for securing wires and cables and the like in a particular location on a surface such as a wall in a building. Binder 2 comprises a rigid planar buckle 4 having a pair of spaced slots of elongated, spaced, parallel slots 6, apertures 8 for screws (not illustrated) or other securing means for securing the buckle in position on the wall or the like, and a flexible strap 10, the ends of which are fitted through the slots. Opposite surfaces of at least each end 11 of the strap, and preferably along the strap itself along its entire length, are provided with hook and pile fastening means (e.g. VELCRO (trade-mark)), the hooks 12 being on one surface (e.g. surface 14) and the pile 16 being on the other surface 18.

Figure 3:
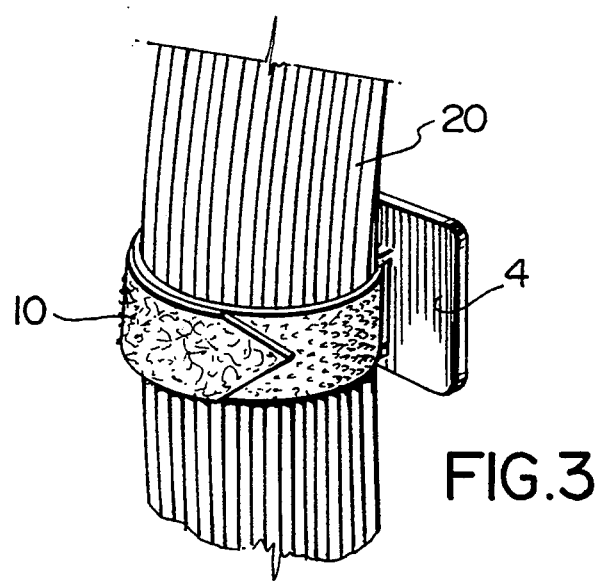
FIG. 3 is a perspective view of a bundle of wires securely wrapped using the binder of FIG. 2.

In this construction, with the strap fitted through slots 6 in buckle 4 as illustrated, its free ends 11 may be secured to each other, in overlapping, abutting relationship, in any relative position so as to snuggly secure a bundle of wires 20 (FIG. 3), the hooks 12 releasably engaging pile 16. When it is desired to free the wires, the ends of strap 10 are merely separated by lifting one end with respect to the other, to pull them. Thus the securing and releasing of such a bundle of wires becomes a very simple task.

Figure 2:
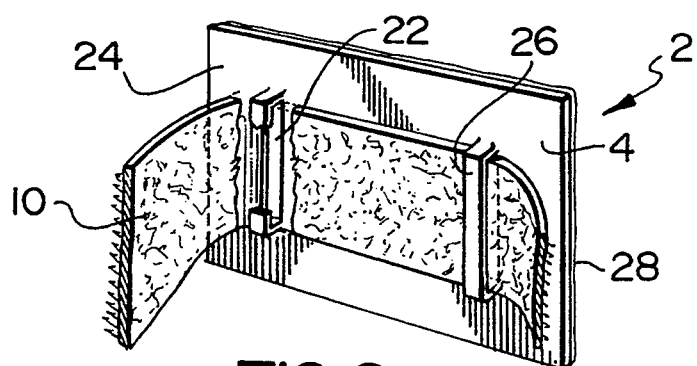
FIG. 2 is a perspective view, partially broken away of an alternative embodiment of binder construction in accordance with the present invention.

In the embodiment of FIG. 2, instead Of slots 6 through which the ends 11 pass, so that portions of the strap slide during use on either side of the buckle, slots 22 are formed on one surface 24 of buckle 4 by means of bridge pieces 26. Slots 22 are aligned from side to side, on surface 24 so that when strap 10 is passed through these slots, it is held securely on surface 24, with its ends 11 to be secured so that strap 10 is looped above that surface. In this manner, if desired, an adhesive such as pressure sensitive adhesive 28 may be placed on the other (rear) surface of buckle 4, for purposes of securing the buckle in position on a wall or the like. Otherwise the construction and operation of this alternative embodiment of binder 2 is similar to that of FIG. 1.

It will be understood that because the strap, in each embodiment, in a sense "floats" within apertures 6 or 22, the strap may be itself oriented and positioned within buckle 4 to provide the most convenient location for the securing of ends 11 in overlapping fashion about a bundle of wires.

Thus it is apparent that there has been provided in accordance with the invention a releasable mounting binder that fully satisfies the objects, aims and advantages set forth above. While the invention has been described in conjunction with a specific embodiment thereof, it is evident that many alternatives, modifications and variations will be apparent to those skilled in the art in light of the foregoing description. For example, while the present invention has been described as having particular utility in grouping and holding wires, it will be readily understood that this device will have many other uses and applications such as holding of ropes, hoses and other devices. Accordingly, it is intended to embrace all such alternatives, modifications and variations as fall within the spirit and broad scope of the invention.

What I claim as my invention:

1. A releasable mounting binder for wires, cables and the like, the binder comprising a one-piece buckle, a pair of spaced slots in the buckle, means to receive securing means for securing the buckle in position on a surface of a body, and a flexible strap having ends to be fitted through the slots so that the buckle is free to move relative to the strap, on the strap, each opposite surface of at least each end of the strap having co-operating hook or pile securing means so that the ends are releasably securable to each other, when in overlapping, abutting relationship, for releasably looping about wires and cables to secure them on the buckle, and wherein the slots are formed under raised, elongated members bridging the buckle on one surface thereof in parallel fashion, so that the strap slides thereunder, to be held between the members and that surface of the buckle.

2. A binder according to claim 1 wherein one surface of the strap is provided with hook securing means, and the other surface of the strap is provided with pile securing means, along the length of the strap.

3. A binder according to claim 1 wherein the buckle is planar.

4. A binder according to claim 1 wherein adhesive is provided on the other surface of the buckle for securing the buckle in position on a surface of a body.

5. A binder according to claim 1 wherein adhesive is provided on the other surface of the buckle for securing the buckle in position on a surface of a body.

6. A binder according to claim 1 wherein apertures are provided in the buckle to receive screws or other such securing means.

7. A releasable mounting binder for wires, cables and the like, the binder comprising a one-piece buckle, a pair of spaced slots in the buckle, means to receive securing means for securing the buckle in position on a surface of a body, and a flexible strap having ends to be fitted through the slots so that the buckle is free to move relative to the strap, on the strap, one surface of the strap being provided with hook securing means, and the other surface of the strap being provided with cooperating pile securing means, along the length of the strap, whereby mutually engageable contacting surfaces are provided along the length of the strap so that, when juxtaposed in overlapping relationship, end portions of the strap become mutually and releasable engageable, and wherein the slots are formed under raised, elongated members bridging the buckle on one surface thereof in parallel fashion, so that the strap alides thereunder, to be held between the members and that surface of the buckle.

8. A binder according to claim 7 wherein the buckle is planar.

* * * * *